United States Patent Office 3,379,667
Patented Apr. 23, 1968

3,379,667
PROCESS OF EMULSIFYING POLYBUTADIENE LATICES WITH A MIXTURE OF ANIONIC/NONIONIC EMULSIFIERS
Gottfried Pampus and Nikolaus Schön, Leverkusen, and Josef Witte, Cologne-Stammheim, Germany, assignors to Farbenfabriken Bayer Aktiengesellschaft, Leverkusen, Germany, a corporation of Germany
No Drawing. Filed Feb. 18, 1964, Ser. No. 345,600
8 Claims. (Cl. 260—29.7)

ABSTRACT OF THE DISCLOSURE

A solution of a butadiene polymer in a hydrocarbon solvent is converted directly into a latex by mixing therewith an aqueous solution of an emulsifier mixture consisting of an anionic emulsifier and a nonionic dispersing agent, and then distilling off the solvent from the resulting emulsion. A catalyst-deactivator may be added to the polymer solution before it is emulsified.

---

The invention relates to improvements in the preparation of latices from butadiene polymers and more particularly relates to a process for preparing stable emulsions from those homopolymers or copolymers of butadiene which have been prepared in organic solvents with the aid of organometallic coordination catalysts or with alkali metal or alkali metal alkyl catalysts. It is known, that these polymers are produced as 5–30% solutions in aliphatic and/or aromatic hydrocarbons. The preparation of emulsions from these solutions is known and generally does not present any difficulties. There are also references in the literature concerning the removal of the solvent from these emulsions by distillation. However, the measures hitherto recommended are unsuitable for an economic process for the production of polybutadiene latices from solutions of the polymers. The following are mentioned as serious disadvantages of the known working methods:

(1) Heavy foaming during the distillation, especially when reduced pressure is to be used during the operation. The known antifoaming agents are ineffective in small doses, while in large doses, they reduce the stability of the emulsion.

(2) The strong foam formation compels slow distillation speeds and the installation of columns or other devices which become obstructed, either quickly or slowly, with precipitated polymer.

(3) During the distillation, some of the polymer, and often 40–70% of its precipitates, due to strong agglomeration of the latex particles, whereby the foam formation usually is even intensified.

It has now been found that butadiene homopolymers and its copolymers can be converted from their polymer solution directly into latices without the said disadvantages by adding after the destruction of the catalyst with the aid of a catalyst-inactivator an aqueous solution of a combination of an anionic emulsifier with a nonionic dispersion agent, the solvent being distilled off from the emulsion which is obtained. The anionic emulsifier is used in quantities of 2 to 10% and the nonionic dispersion agent in quantities of 4–20%, based on the butadiene polymer being used, and in addition, to each part by volume of polymer solution, at least 0.3 to at most 3.0 (and advantageously 0.5 to 1.5) parts by volume of aqueous phase are used in the emulsion. Alkali metals, alkali metal alkyls and metalorganic complex catalysts such as lithium, sodium, lithium - butyl, lithium - phenyl, titanium - tetrachloride/iodine/aluminum - triisobutyl or titanium - tetraiodide/aluminum - triisobutyl, salts of cobalt or nickel together with alkyl - aluminum - halides may be used as polymerization catalysts. When polymerization is finished the catalysts may be destroyed by catalyst-inactivators. Such catalyst inactivators are e.g. aliphatic, cycloaliphatic or aromatic carbon acids, alcohols, amines, ketones.

If the emulsion prepared contains more than 4% of anionic emulsifier and more than 10% of nonionic dispersion agent, a polyhydroxy compound can be added to the emulsion before the distillation in quantities of 0.1% to 5.0% based on the polymer used. As a result, one particular embodiment of the process described herein becomes possible, in which, after distilling off the solvent and creaming the latex, the clear serum separated out can be returned into the process and in this way both uneconomic losses of emulsifier and also waste water problems are avoided.

The solvents can be distilled off from the emulsions prepared according to the process with high distillation speeds and with very little foam formation. Despite the relatively high emulsifier concentrations, no antifoaming agents are necessary and special equipment becomes superfluous even when the distillation is carried out at a pressure from 50–500 mm. Hg.

By "butadiene polymers" within the terms of the present process are understood homopolymers of butadiene and copolymers with isoprene and/or aromatic vinyl compounds, such as styrene, $\alpha$ - methylstyrene or divinylbenzene. The comonomers should not make up more than 50 mol. percent and those of the divinylbenzene not more than 5 mol. percent of the polymer and can be incorporated either statistically or as a block in the molecule. The solution viscosity $[\eta]$ of the polymers is advantageously between 0.2 and 4.0. The butadiene polymers are used in the form of their 5–20% solution in aliphatic hydrocarbons with a boiling point in the range of $+10°$ to $+150°$ C. such as petroleum ether, pentane, cyclohexane, diisobutylene or aromatic hydrocarbons with a boiling point from $+80°$ to $+150°$ C. such as benzene, toluene or isopropyl benzene or their mixtures. For the homopolymers of butadiene as well as copolymers with a low content of comonomers, the process described herein provides the best results with benzene or toluene, optionally in admixture with aliphatic compounds of approximately the same boiling range.

More especially suitable as anionic emulsifiers are the alkali salts of saturated or unsaturated fatty acids with 10–20 carbon atoms, resinic acids, copolymers of styrene or isobutylene with maleic acid or methacrylic acid or sulphuric acid semiesters of alcohols such as lauryl sulphate or dodecyl sulphate, or sulphated reaction products of alkyl phenols or fatty acids with 5–50 mols of ethylene oxide.

By nonionic dispersion agents, there are understood the reaction products of alcohols such as dodecanol, oleyl alcohol or nonyl phenol or fatty acids with 5 to 50 mols of ethylene oxide.

For the preparation of the emulsion, the equipment usual in the art for this purpose is used, such as high-speed stirrer devices or ultrasonic devices.

Suitable polyhydroxy compounds which cause a creaming up of the prepared latices are alginates, methyl cellulose or reaction products of sugars, for example sorbitol with ethylene oxide.

The solvent can be distilled off from the emulsion in normal stirrer-type vessels and at temperatures from $+10$ to $+110°$ C. and at a pressure of 50 to 760 mm. Hg. From the emulsions prepared as described above, the organic solvent can be distilled off in very short times and, after being dried, can be returned immediately into the polymerization process. Even with a high proportion of emulsifier, the foam formation is unusually weak. The precipitation of polymer is very slight and it scarcely adheres to the walls of the vessel.

The latices prepared according to the invention can with advantage, possibly after being concentrated with the aid of conventional processes, be used directly as rubber latices; however, they are suitable in particular manner for the production of graft polymers.

Example 1

To a solution of polybutadiene being prepared by polymerization of butadiene with a titanium iodide-aluminum alkyl-catalyst (content of 1,4-cis-linkage=93%, Mooney value ML-4'=41) in toluene, 2% of stearic acid and 0.1% of 2,6-di-tert.-butylphenol is added in order to destroy the catalyst. To 1500 parts of this solution, containing 110 parts of polybutadiene, 3 parts of oleic acid are added, are then emulsified with a solution of 1.4 parts of potassium hydroxide and 10 parts of a reaction product of nonyl phenol with 7 mols of ethylene oxide in 300 parts of water and thereafter another 700 parts of water and thereafter another 700 parts of water are added. The particle size is $2\mu$. From this emulsion, the toluene is distilled off without appreciable foam formation at 80° C. and 250 mm. Hg. With a batch of 2.5 liters of emulsion in a glass stirrer-type vessel, a latex free from toluene and with a particle size of $2.2\mu$ is obtained in 40 minutes.

If 25 liters of emulsion are placed in a normal 40-liter stirrer-type autoclave, it is possible without any difficulty to achieve distillation speeds of 10 liters of toluene per hour; the precipitation is 0.8% of the polybutadiene introduced.

Example 2

To a solution of polybutadiene being prepared by polymerization of butadiene with a cobalt halide-aluminum-diethylchloride catalyst (content of 1,4-cis-linkage=98%, Mooney value ML-4'=12) in benzene is 0.5% of disproportionated resinic acid and 0.1% of 2,6-di-tert.-butyl-4-methylphenol to destroy the catalyst and for stabilization purposes. 2000 parts of this solution, which contains 220 parts of polybutadiene, are emulsified with 1700 parts of water with the addition of 15 parts of a sulphated reaction product of nonyl phenol with 30 mols of ethylene oxide and 30 parts of the nonsulphated product and 15 parts of methyl cellulose. The particle size is $1.5\mu$. From 2.2 liters of this emulsion, all the benzene is distilled off in one hour. The particle size remains unchanged and the precipitation is 0.4% of the polybutadiene introduced. 8 hours after completing distillation, 1500 parts of a clear serum have been deposited and these are used for the preparation of fresh emulsions. 450 parts of creamed latex with a polymer content of 46% are obtained.

Example 3

To 1000 parts by weight of a 15 percent solution of a butadiene copolymer with 10 mol percent of isoprene and a molecular weight corresponding to a viscosity $(\eta)=1.8$ which was produced by copolymerization of butadiene and isoprene in cyclohexane with 0.05 percent by weight of lithiumbutyl as a catalyst, adding 0.1 part by weight of stearic acid and 0.1 part by weight of 2,6-di-tert.-butyl-4-methylphenol. This solution is emulsified with 4 parts lauryl-sulphate and 8 parts of the reaction product of nonyl phenol with 15 mols of ethylene oxide in 800 parts of water to a particle size of $1\mu$. From this emulsion the cyclohexane is distilled off without appreciable foam formation at 60° C. and 500 mm. Hg. 700 parts of a 21 percent latex with a particle size of 1.7 are obtained. The precipitation of the polymer is below 1 percent.

Example 4

To 2000 parts by weight of a 12% solution of a butadiene copolymer with 20 mol percent of styrol, which was produced by polymerization of butadiene and styrol with lithium butyl in the presence of an equimolar amount of glycol dimethyl ether in toluene as solvent, 1.2 parts of tert.-butyl-hydroquinone are added to stabilize the polymer and it is emulsified with 10 parts of the calcium salt of the cocoa oil acid and 14 parts of an oxethylated oleyl alcohol in 1200 parts of water. 25 liters of the so produced emulsion (particle size below $1\mu$) are delivered in a normal 40 liter stirrer-type autoclave speed of 12–14 liters toluene per hour from the solvent.

800 parts of a 30 percent latex are obtained whose particle size remains unchanged.

Example 5

1000 parts by weight of a 20 percent benzene solution of a block polymer of butadiene with 12 mol percent of styrene (molecular weight corresponding $(\mu)=0.8$) are emulsified with 10 parts of the potassium salt of the abietinic acid, 25 parts oxethylated abietinic acid and 1 part sodium alginate in 1000 parts by weight of water. The particle size is below $1\mu$. The benzene is distilled off at 85° C. and 760 mm. Hg. The precipitation is 1.5% of the polymerizate. The obtained latex is creamed during the refrigeration. After 5 hours 800 parts of a 50% latex with a particle size of 2.5 are separated. 600 parts of a clear serum are obtained, which is to be used for the preparation of fresh emulsions.

What we claim is:

1. A process for the preparation of a purified latex which comprises polymerizing butadiene in toluene in the presence of a titanium halide/alkyl aluminum catalyst to form a solution of polybutadiene, adding to the latter sufficient stearic acid and 2,6-di-tert.-butylphenol to destroy the catalyst, emulsifying the resulting solution with an aqueous solution of an emulsifier mixture of an anionic emulsifier and a nonionic dispersing agent, distilling off the toluene, and recovering the polybutadiene latex.

2. A process for the preparation of a purified latex which comprises polymerizing butadiene and isoprene in cyclohexene in the presence of a lithium alkyl catalyst to form a solution of copolymer, adding thereto sufficient stearic acid and 2,6-di-tert.-butyl-4-methylphenol to destroy the catalyst, emulsifying the resulting solution with an aqueous solution of lauryl sulphate and the reaction product of nonyl phenol with 15 mols of ethylene oxide, distilling off the cyclohexane, and recovering the copolymer latex.

3. In a process for preparing a latex by the steps of polymerizing butadiene with itself or with a comonomer selected from the group consisting of isoprene, styrene, alpha-methyl styrene and divinylbenzene, wherein the butadiene content is at least 50 mol percent, conducting the polymerization in a hydrocarbon solvent in the presence of a catalyst selected from the group consisting of an alkali metal, an alkali metal alkyl, and a metalorganic complex compound, emulsifying the dissolved polymer with an aqueous emulsifier solution, removing the hydrocarbon solvent by distillation and recovering the polymer latex, the improvement wherein in the emulsifying step there is added to the hydrocarbon solution of the polymer an aqueous solution of an emulsifier mixture consisting of an anionic emulsifier and a nonionic dispersing agent.

4. The process of claim 3 wherein the polymer is 1,4-cis-polybutadiene.

5. In a process for preparing a latex by the steps of polymerizing butadiene with itself or with a comonomer selected from the group consisting of isoprene, styrene, alpha-methyl styrene and divinylbenzene, wherein the butadiene content is at least 50 mol percent, conducting the polymerization in a hydrocarbon solvent in the presence of a catalyst selected from the group consisting of an alkali metal, an alkali metal alkyl compound and a metalorganic complex compound, adding to the resulting hydrocarbon solution of polymer a catalyst deactivating agent, emulsifying the dissolved polymer with an aqueous emulsifier solution, removing the hydrocarbon solvent by distillation and recovering the polymer latex, the improvement wherein in the emulsifying step there is added to the hydrocarbon solution of polymer an aqueous solution of an emulsifier mixture consisting of 2–10 parts by weight of an anionic emulsifier and 4–20 parts by weight of a nonionic dispersing agent, based on 100 parts by weight of polymer.

6. The process of claim 5 wherein the polymer is emulsified with a mixture of potassium salt of oleic acid and a polyoxymethylated nonyl phenol containing 7 ethylene oxide units.

7. The process of claim 5 wherein the polymer is emulsified with a mixture of a polyoxyethylated nonyl phenol sulfonate containing 30 ethylene oxide units and a polyoxyethylated nonyl phenol containing 30 ethylene oxide units.

8. The process of claim 5 wherein a mixture of stearic acid and 2,6-di-tert.-butyl-4-methylphenol is added to the hydrocarbon solution of the polymer to deactivate the catalyst.

References Cited

UNITED STATES PATENTS

| | | | |
|---|---|---|---|
| 2,799,662 | 7/1957 | Ernst et al. | 260—29.7 |
| 2,880,184 | 3/1959 | Groves et al. | 260—29.7 |
| 3,111,498 | 11/1963 | Ray et al. | 260—29.7 |

FOREIGN PATENTS

| | | |
|---|---|---|
| 790,070 | 2/1958 | Great Britain. |

WILLIAM H. SHORT, *Primary Examiner.*

J. NORRIS, *Assistant Examiner.*